July 10, 1923.
E. J. TOMLINSON
GOVERNOR FOR ELECTRIC CIRCUITS
Filed June 8, 1920     2 Sheets—Sheet 1
1,461,103
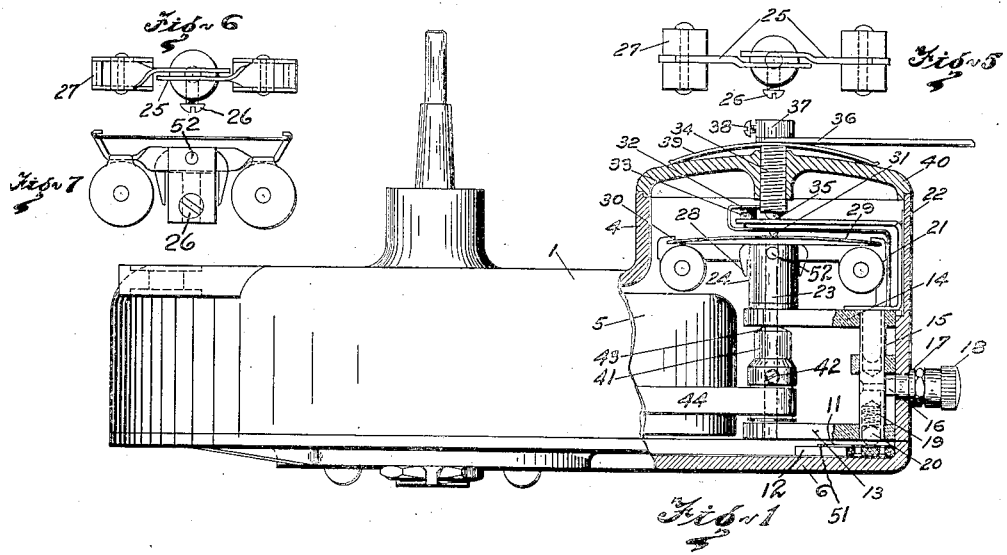
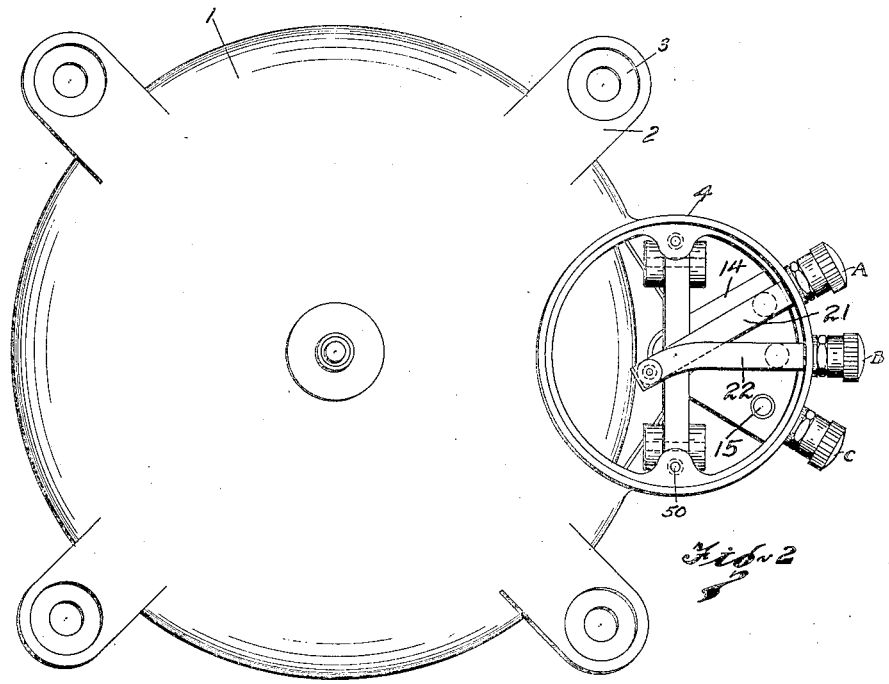
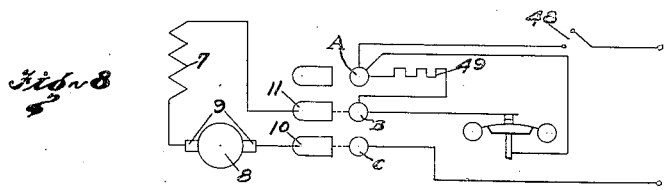
INVENTOR
Edward J. Tomlinson
BY
Albion D. T. Libby
ATTORNEY July 10, 1923.
E. J. TOMLINSON
GOVERNOR FOR ELECTRIC CIRCUITS
Filed June 8, 1920
1,461,103
2 Sheets-Sheet 2
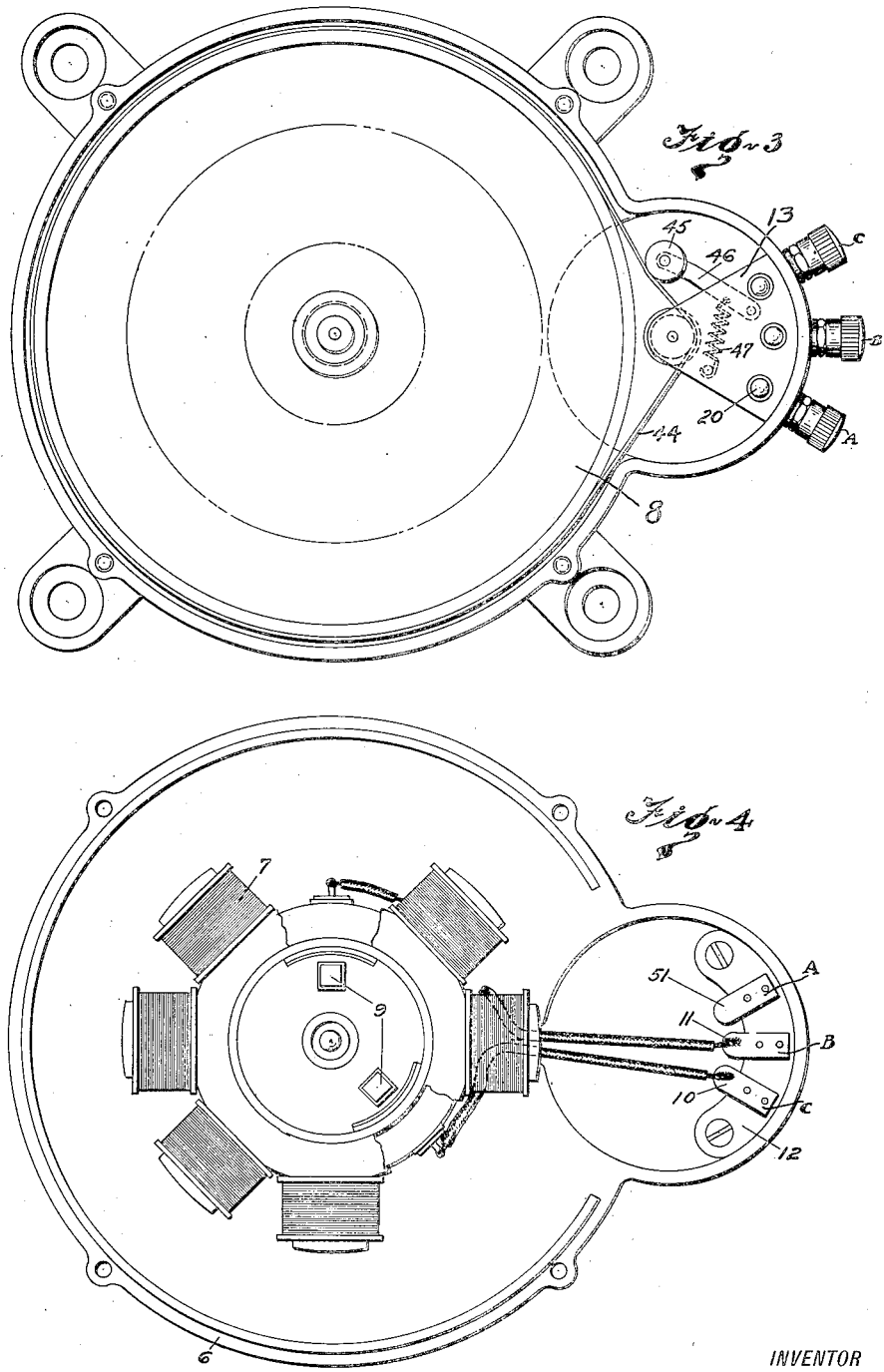
INVENTOR
Edward J. Tomlinson
BY
Albion D. T. Libby
ATTORNEY Patented July 10, 1923.

1,461,103

UNITED STATES PATENT OFFICE.

EDWARD J. TOMLINSON, OF NEWARK, NEW JERSEY, ASSIGNOR TO SPLITDORF ELECTRICAL COMPANY, OF NEWARK, NEW JERSEY.

GOVERNOR FOR ELECTRIC CIRCUITS.

Application filed June 8, 1920. Serial No. 387,496.

*To all whom it may concern:*

Be it known that I, EDWARD J. TOMLINSON, a citizen of the United States, residing at Newark, in the county of Essex, State of New Jersey, have invented certain new and useful Improvements in Governors for Electric Circuits, of which the following is a description, reference being had to the accompanying drawing and to the figures of reference marked thereon.

This invention relates to a governor for electric circuits and as illustrated is particularly adapted for use in governing the speed of phonograph motors.

In my application Serial No. 382,794 filed May 20, 1920, I have shown and described an electric motor in which the various parts of the motor, such as the field, armature and commutator, brushes, etc., may be readily gotten at for the purpose of replacements, cleaning or repairing. In the motor described in the above mentioned application the armature structure is carried within a stationary casing which is closed by means of a cover plate carrying the field and commutator brushes, etc. The electrical connections as described in said application are so arranged that the cover plate can be removed without disconnecting any of the wires themselves, through the medium of flexible engaging contacts. In said application, no particular form of governor for the motor was described. It is, therefore, the principal object of my present application to describe a governor suitable for operation in connection with a motor of the character described in said copending application.

Another object of my invention is to arrange the electrical connections to the governor parts in such a way that the cover plate carrying the field structure of the motor may be removed without displacing the electrical connections to the governor parts.

Another object of my invention is to provide a housing for the governor which is substantially dustproof, but which may be readily opened for the inspection and adjustment of the governor parts.

Other and further objects will be apparent to one skilled in the art after a study of the specification taken in connection with the annexed drawing, wherein:

Figure 1 is a view of my phonograph motor with a portion of the casing broken away to show the governor parts in certain position.

Figure 2 is a top view of Figure 1 but with the small cover plate over the governor removed.

Figure 3 is a bottom view of Figure 1 but with the main cover plate removed.

Figure 4 is a view of the main cover plate as removed from Figure 3 with two of the field coils removed to show certain details.

Figure 5 is a plan view of part of the governor mechanism shown in Figure 1.

Figure 6 is a plan view of a modified form of governor somewhat similar to that shown in Figures 1 and 5.

Figure 7 is a side elevation of Figure 6;

While Figure 8 is a diagrammatical view of the electrical circuit through the motor and governor.

Referring now to the details wherein like numbers refer to the corresponding parts in the various views 1 is a main casing adapted to be mounted through the medium of lugs 2 on the usual mounting board of a phonograph. In mounting the motor in the phonograph, I prefer to use soft rubber bushings 3 in connection with the lugs 2 and in addition I may utilize intermediate the mounting board and the lugs 2, a further resilient member, such as a coil spring. The casing 1 has a projection 4 within which the governor mechanism is mounted. The rotating part of the motor 5 is carried within the main casing 1 and is held in position therein by the cover plate 6 which carries the field coils 7. The electric motor itself, including the armature 8, the brushes 9 and yielding terminals 10 and 11 are permanently attached to the cover plate 6, being insulated therefrom through the medium of insulator 12. Carried within the casing extension 4 and fastened to the side wall thereof are two plates 13 and 14 preferably of some insulating material such as fibre. The plates 13 and 14 are held in permanent spaced relationship through the medium of a plurality of metallic connectors 15, which in turn have studs 16 fastened thereto in any suitable manner. The studs 16 pass through the side walls of the casing, but are insulated therefrom by insulators 17, thumb nuts 18 being attached to the outer end of the stud 16 for the purpose of clamping electrical conductors underneath the shoulders of the thumb nuts 18.

The lower ends of the metallic connectors 15 are preferably hollow and each of them carry a coil spring 19 which presses against a ball 20. The ball 20 is prevented from flying out of the metallic connector 15 when the cover plate 6 is removed by having the ends of the connectors 15 slightly bent over. It is seen in Figures 1, 3 and 4 when the cover plate 6 is in position the contacts 10 and 11 make a yielding connector with the balls 20. The plate 14 supports a plurality of springs, which in the form of the governor shown, is made up of springs 21 and 22, each connected to different connectors 15. The plates 13 and 14 carry a rotatable shaft 23, on the outer end of which, adjacent to plate 14 is a collar 24 secured to the shaft by means of a screw 26. The collar 24 at its outer end is preferably slotted and carries a pair of similarly constructed arms 25 which are pivotally fastened to collar 24 and the shaft 23 in any suitable manner, such as by a pin 52. On the outer ends of the arms 25 are weights 27 which are responsive to centrifugal force, as the shaft 23 rotates. The inner ends of the arms 25 have fingers 28 which are closely adjacent the collar 24 so that as the weights 27 respond to centrifugal force and tend to move outwardly, the movement is finally stopped by the fingers 28 coming in contact with the collar 24, whereby only a certain amount of movement of the member 29, carried by and between the outer ends of the arms 25, is permitted. The member 29 is preferably resilient in its nature so that it may be readily sprung into place under the shoulders 30. The springs 21 and 22 extend over the member 29 in such a manner that one of them, for example 21, which carries a bumper 31 is in operative engagement with the member 29. The spring 21 is bent over as indicated and carries a contact 32, which is adapted to co-operate with contact 33 carried on the spring 22. Normally the springs 21 and 22 are so formed that the normal tension of the spring 21 is such as to carry the contact 32 toward the end of the operating shaft 23; while the tension of the spring 22 is such as to carry the contact 33 in the opposite direction. Means for adjusting the relative position between the springs 21 and 22 and their co-operating contacts 32 and 33 is provided in the form of a screw 34 which preferably has a fibre button 35 adapted to engage one of the springs, such as 22. To the outer end of the screw 34 is fastened a lever 36 through the medium of an integral collar 37 and screw 38. A resilient member 39 is pressed intermediate the lever 36 and the governor cover plate 40 which carries the screw 34, the cover plate 40 being held to that part of the casing 4 in any suitable manner as by screws entering a screw hole 50 (see Figure 2), whereby the screw 34 will not shift of itself, but only when operated by the lever 36.

Carried on the shaft 23 between the plates 13 and 14 is a spacing member 41 which may be fastened to the shaft 23 in any suitable manner, a set screw 42 being indicated. One end of the spacing member 41 is preferably beveled off at 43 so as to reduce the friction between it and the plate 14, as shaft 23 rotates. The opposite end of the spacing member 41 is preferably formed to serve as a pulley for driving the shaft 23. As indicated in Figure 1 a flat belt 44 is indicated engaging said pulley surface and the outer periphery of the rotating member 5. It will be apparent that any suitable driving means may be used between the member 5 and the shaft 23. In some cases I may use an idler pulley 45 (see Figure 3) which is carried on an arm 46 supported by the plate 14, the pulley 45 being held against the belt 44 by a resilient member 47.

Instead of the form of governor arms and weights indicated in Figures 1 and 5, I may use an equivalent form as shown in Figures 6 and 7 wherein the arms 25 may be punched and the weights 27 riveted between two punched ears, forming part of the arms 25.

In the operation of my device, it will be seen that when current is applied to the motor through the medium of a switch 48, the rotating structure 5 will begin to turn and the driving shaft 23 of the governor will operate the contacts 32 and 33 to open and close a shunt around the non-inductive resistance 49, thereby regulating the amount of current which passes through the motor and consequently its speed of rotation. Should it be desired to change the speed, the lever 36 is moved to change the relative position of the contacts 32 and 33 as described.

In the various figures, I have shown an extra terminal 51 on the main cover plate 6 and a corresponding co-operative contact on the main casing. These co-operating contacts in Figures 2, 3 and 8, I have indicated by the letters A, B and C. The terminal A only being used as a junction point when used in connection with the type of governor shown, wherein the contacts 32 and 33 do not rotate as does one of the contacts as described in my co-pending application Serial No. 288,385 filed April 9, 1919.

While I have shown and described one form of governor in connection with the motor illustrated, it is to be understood that any other suitable type of governor, for example one similar to the application just mentioned above, may be used in connection with the said motor. It will also be apparent that numerous changes and alterations may be made in the various details without departing from the spirit of my invention and the scope of the appended claims.

Having thus described my invention, what I claim is:

1. In a governor for an electrical circuit, the combination of a plurality of plates and means for supporting the same, a rotatable shaft carried by said plates and having at one end a collar, a plurality of arms pivoted to said collar, said arms having weights at their outer ends and stop fingers at their other ends to engage said collar, a member carried by and between the outer ends of said arms, a spring in operative engagement with said member and carrying a contact, a second spring carrying a contact to co-operate with the first mentioned contact and means for adjusting the position of the second contact with reference to the first.

2. In a governor for an electrical circuit, the combination of, a plurality of plates and means for supporting the same, a rotatable shaft carried by said plates and having at one end a collar and a combined spacing and pulley member between said plates, a plurality of arms pivoted to said collars, said arms having weights at their outer ends and stop fingers at their other ends to engage said collar, a resilient member carried by and between the outer ends of said arms, a pair of springs supported on one of said plates carrying co-operating contacts and extending over said resilient member in such a manner that one of said springs is in operative engagement with said resilient member and means for adjusting the relative position of said springs for varying the time of actuation of said contacts.

3. In a governor for an electric motor, a casing, a pair of plates spaced apart by metallic connectors having terminal studs fastened to said casing and extending therethrough but insulated therefrom, a rotatable shaft carried by said plates, a combined spacing and pulley member on said shaft between said plates, a collar on the shaft exterior but adjacent one of said plates, a plurality of arms pivoted to said collar and shaft, said arms having weights at their outer ends and stop fingers at their other ends to engage said collar, a resilient member carried by and between the outer ends of said arms, a spring supported on one of said plates in engagement with one of said connectors, a second spring supported on the same plate and in engagement with another of said connectors, said springs carrying co-operating contacts and extending over said resilient member in such a manner that one of them is in operative engagement with said resilient member and means for adjusting the relative position of said springs for varying the time of actuation of said contacts.

4. In a structure of the class described electric motor mechanism and a governor mechanism therefor, a casing for the motor mechanism and having a projection for housing said governor, a plurality of plates fastened to but spaced away from each other and the wall of said projecting housing, a shaft carried by said plates, arms responsive to centrifugal force pivotally fastened to the end of said shaft, a member supported by and between the outer ends of said arms, a pair of springs carrying co-operating contacts extending over said member in such a manner that one of said springs is in operative connection with said member, means for adjusting the relative position of the said two springs and means including a rotating part of said motor for operating said shaft.

5. In a structure of the class described electric motor mechanism and a governor mechanism therefor, a casing for the motor mechanism and having a projection for housing said governor, a plurality of plates fastened to but spaced away from each other and the wall of said projecting housing, a shaft carried by said plates, arms responsive to centrifugal force pivotally fastened to the end of said shaft, a member supported by and between the outer ends of said arms, a pair of springs carrying co-operating contacts and arranged in such a manner that one of said springs is in operative connection with said member, a readily removable cover plate for said projecting housing, an adjustable device carried by said cover plate for adjusting the relative position of said two springs and driving means on said shaft between said plates with means for acting on the driving means from a rotatable part of said motor.

6. In a structure of the class described electric motor mechanism and a governor mechanism therefor, a casing for the motor mechanism and having a projection for housing said governor mechanism, a shaft positioned within said projection, arms responsive to centrifugal force pivotally mounted on said shaft, a pair of spring mounted contacts, means controlled by the movement of said arms for operating said contacts, means for adjusting the relative position of one contact with respect to the other, means for driving said shaft from the rotating part of said motor and yielding connecting means electrically connecting the springs carrying said contacts with the motor circuit.

7. In a structure of the class described electric motor mechanism and a governor mechanism therefor, a casing for the motor mechanism and having a projection for housing said governor mechanism, a shaft positioned within said projection, arms responsive to centrifugal force pivotally mounted on said shaft, a pair of spring mounted contacts, means controlled by the movement of said arms for operating said contacts, a cover plate for the projecting part of said housing, adjustable means operable from the exterior of said cover plate for adjusting the relative position of one contact with respect to the other, means for driving said shaft from the rotating part of said motor, a main cover plate for the motor casing carrying part of the motor mechanism and yielding connecting means carried on the main cover plate and housing for electrically connecting the springs carrying said contacts with the motor circuit.

8. In a structure of the class described electric motor mechanism and a governor mechanism therefor, a casing for the motor mechanism and having a projection for housing said governor mechanism, a shaft positioned within said projection, arms responsive to centrifugal force pivotally mounted on said shaft, a pair of spring mounted contacts, means controlled by the movement of said arms for operating said contacts, means for adjusting the relative position of one contact with respect to the other, a pulley on said shaft adapted to receive a belt passing around the rotatable part of said motor within the casing and yielding connecting means for electrically connecting the springs carrying said contacts with the motor circuit.

9. In a structure of the class described electric motor mechanism and a governor mechanism therefor, a casing for the motor mechanism and having a projection for housing said governor mechanism, a shaft positioned within said projection, arms responsive to centrifugal force pivotally mounted on said shaft, a pair of spring mounted contacts, means controlled by the movement of said arms for operating said contacts, a cover plate for the projecting part of said housing, adjustable means operable from the exterior of said cover plate for adjusting the relative position of one contact with respect to the other, a pulley on said shaft adapted to receive a belt passing around the rotatable part of said motor within the casing, an idler for taking up the slack in said belt, a main cover plate for the motor casing carrying part of the motor mechanism, yielding terminals on said plate for the motor mechanism, yielding connectors mounted within said housing projecting and connected to the springs carrying said contacts whereby when the main cover plate is in position on the casing the governor contacts are connected into the motor circuit as described.

In testimony whereof I affix my signature.

EDWARD J. TOMLINSON.